United States Patent [11] 3,623,818

[72] Inventors Edward E. Gardner
Shelburne, Vt.;
William A. Keenan, Poughkeepsie; Paul A. Schumann, Jr., Wappingers Falls, N.Y.

[21] Appl. No. 885,002
[22] Filed Dec. 15, 1969
[45] Patented Nov. 30, 1971
[73] Assignee International Business Machines Corporation
Armonk, N.Y.

[54] MEASUREMENT OF CARRIER CONCENTRATION OF SEMICONDUCTOR MATERIAL
4 Claims, 6 Drawing Figs.

[52] U.S. Cl. .......... 356/209, 350/160, 250/83.3 R, 324/158
[51] Int. Cl. .......... G01n 21/48, G01t 1/16
[50] Field of Search .......... 350/160; 250/83.3 R; 356/209 T; 324/158

[56] References Cited
OTHER REFERENCES

Stern, " Elementary Theory of the Optical Properties of Solids," in Solid State Physics, Academic Press (New York) 1963, pp. 299- 301, 320, 321. QC 174 56

Birnbaum, " Modulation of the Reflectivity of Semiconductors," J. App. Physics, 36, 1965, pp. 657- 658. QC 1 J82

Birnbaum & Stocker, " Effect of .... Semiconductor Reflectivity Modulation," Brit. J. App. Phys. 17, 1966, pp. 461- 465 (Sci. Library)

Blinov et al., " Carrier Density in a Semiconductor Illuminated With a Laser," Soviet Physics— Solid-State 9, (3) Sept. 1967, pp. 666- 669. (QC Sec. of Sci. Library)

*Primary Examiner*—Ronald L. Wibert
*Assistant Examiner*—Robert J. Webster
*Attorney*—Joseph L. Spiegel

ABSTRACT: Carrier concentration of a semiconductive material is measured by directing monochromatic light at the material. The light is polarized with its electric vector in the plane of incidence. The angle of incidence is varied until a minimum in reflectivity occurs. The angle at which the minimum occurs, referred to as the pseudo-Brewster angle $\theta_B$, is related to the carrier concentration, whence the carrier concentration may be determined by comparison with a series of standards or by calculation.

INVENTORS
EDWARD E. GARDNER
WILLIAM A KEENAN
PAUL A. SCHUMANN, JR.

BY Joseph L. Spiegel
ATTORNEY

MEASUREMENT OF CARRIER CONCENTRATION OF SEMICONDUCTOR MATERIAL

Background of the Invention

1. Field of the Invention

The invention relates to a nondestructive, contactless technique for measuring the carrier concentration of a semiconductor body. By carrier concentration is meant the concentration of electrical charge carriers in the material.

2. Description of the Prior Art

Carrier concentration has been and is still being measured by a number of techniques requiring contact to the semiconductor. Among these are the Hall Effect, the four-point probe and the spreading resistance techniques.

In a contactless technique for determining carrier concentration, known as the plasma resonance technique, infrared light is directed at the surface of the semiconductive material. The angle of incidence is maintained constant and the wavelength of the light is varied. This technique has certain disadvantages, the principal ones being that a very expensive spectrophotometer which puts out a wide range of infrared wavelengths is required, and, secondly, its effective range of carrier concentration measurement is limited to concentrations from $5\times10^{18}$ carriers/cm.$^3$ and above.

Schumann and Phillips in an article entitled, "Comparison of Classical Approximations to Free Carrier Absorption in Semiconductors" at 10 Solid State Electronics No. 9, 943–48 Sept., 1967) relate the optical constants of a semiconductor to its carrier concentration.

SUMMARY OF THE INVENTION

An object of the invention is a nondestructive, contactless technique for measuring the carrier concentration of a semiconductor.

Another object is the extension of the range of carrier concentration that can be measured by optical techniques.

Still another object is a simple, inexpensive technique for measuring the carrier concentration of a semiconductor.

A further object is such a technique which is readily automatable.

These and other objects are accomplished in accordance with the present invention one illustrative embodiment of which comprises utilization of a monochromatic light source, polarizer, diffractometer and detector. The light source is directed at the material whose carrier concentration is to be measured. The light is polarized with its electric vector in the plane of incidence. The angle of incidence is varied by means of the diffractometer until a minimum in reflectivity occurs. The angle at which the minimum occurs, referred to as the pseudoBrewster angle, is related to the carrier concentration, whence the carrier concentration may be determined by comparison with a series of standards or by calculation.

In some instance there will be two values of carrier concentration for the same $\theta_B$, wherefore additional steps must be employed to determine which of the two values is correct. These additional steps involve either a crude measurement of the magnitude of the reflected light at $\theta_B$, or measuring the angles above and below $\theta_B$ at which the reflectivity is an order of magnitude or some convenient valve greater than the value of reflectivity at $\theta_B$, or measuring reflectivity at $\theta_B$ of the light polarized perpendicular to the plane of incidence.

BRIEF DESCRIPTION OF THE DRAWING

The foregoing and other objects, features and advantages of the present invention will be apparent from the following, more particular description of the preferred embodiment of the invention as illustrated in the accompanying drawing, wherein.

DESCRIPTION OF THE PREFERRED EMBODIMENTS

Figure 1:
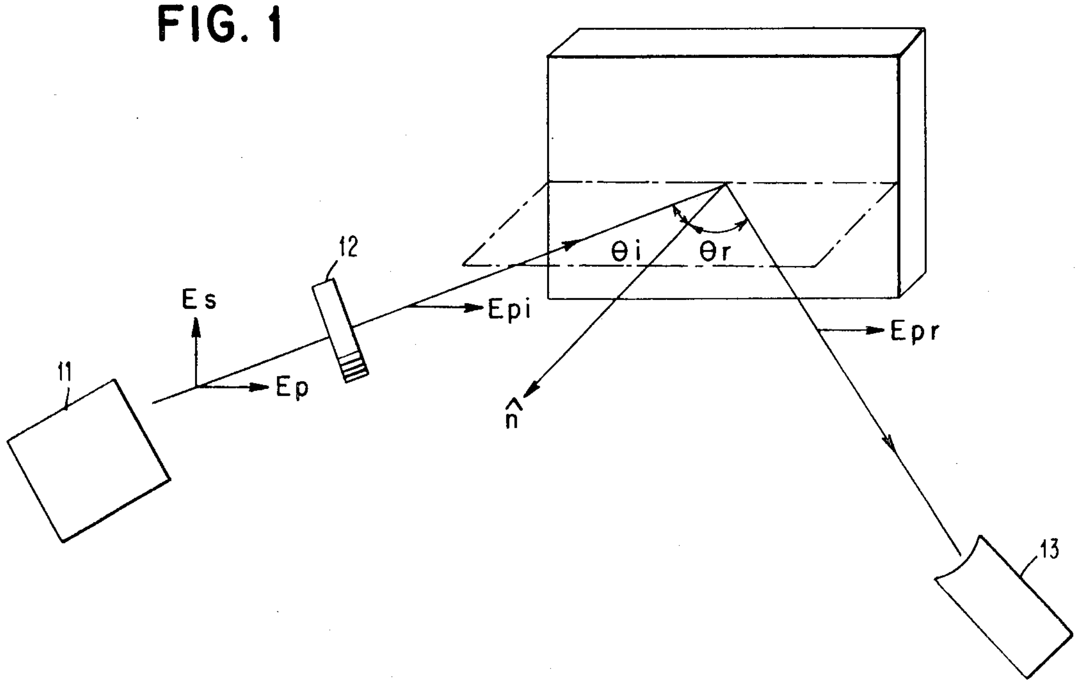
FIG. 1 is a schematic illustration of the technique for measuring carrier concentration in accordance with the teachings of the present invention.

Referring now to the drawing, FIG. 1 illustrates in schematic the technique used for measuring carrier concentration in accordance with the teachings of the present invention. The apparatus used to carry out the technique includes a monochromatic light source 11, typically a laser, a polarizer 12, some means, typically a diffractometer (not shown) for varying the angle of incidence $\theta_i$ and reflection $\theta_r$ with respect to a sample whose carrier concentration is being measured, such that $\theta_i=\theta_r$, a detector 13, and, if desired, a recorder (not shown) associated with the detector.

Infrared light, with a wavelength corresponding to light whose energy is less than the energy band gap of the material under study, is directed from the light source 11 and through a polarizer 12 upon the sample in such manner that one has an incident beam of light with the electric vector in the plane of incidence.

The light is incident on the sample at angle of incidence $\theta_i$ equal to $\theta_r$. These angles are varied to determine the angle at which reflectivity attains a minimum. The reflected light is measured by detector 13.

Figure 2:
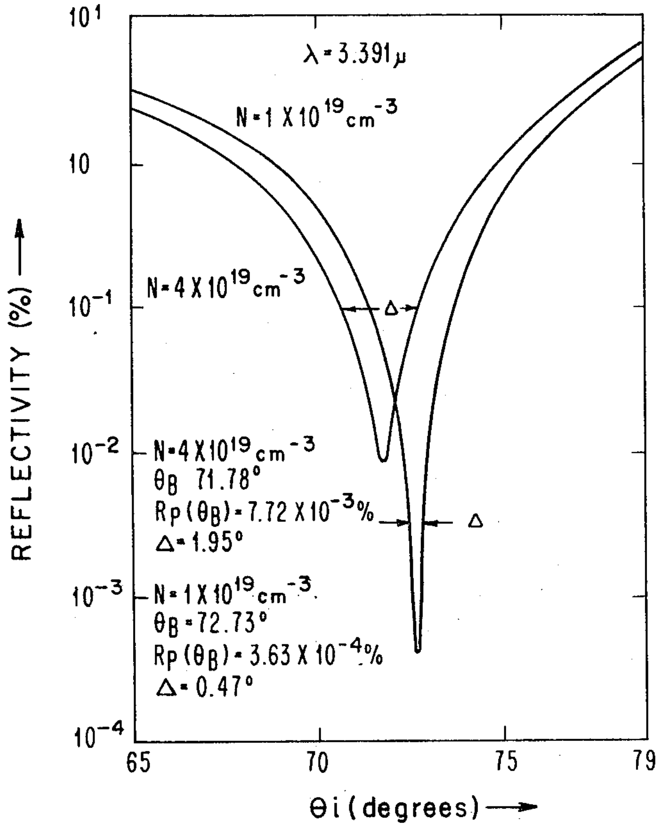
FIG. 2 is a graph showing calculated reflectivity as a function of $\theta_i$ for infrared light, with the electric vector polarized in the plane of incidence, for two different carrier concentrations.

FIG. 2 of the drawing illustrates calculated reflectivity as a function of $\theta_i$, for infrared light, typically 3.391 microns wavelength, with the electric vector polarized in the plane of incidence, for two different carrier concentrations.

Comparing the two curves, one notes that the angle at which the reflectivity attains a minimum changes as one changes the carrier concentration of the semiconductor. Additionally, sharpness $\Delta$ of the minimum and the magnitude of the reflectivity change with change in concentration. The angle at which the reflectivity attains a minimum is a measure of the carrier concentration of the semiconductor.

Figure 3:
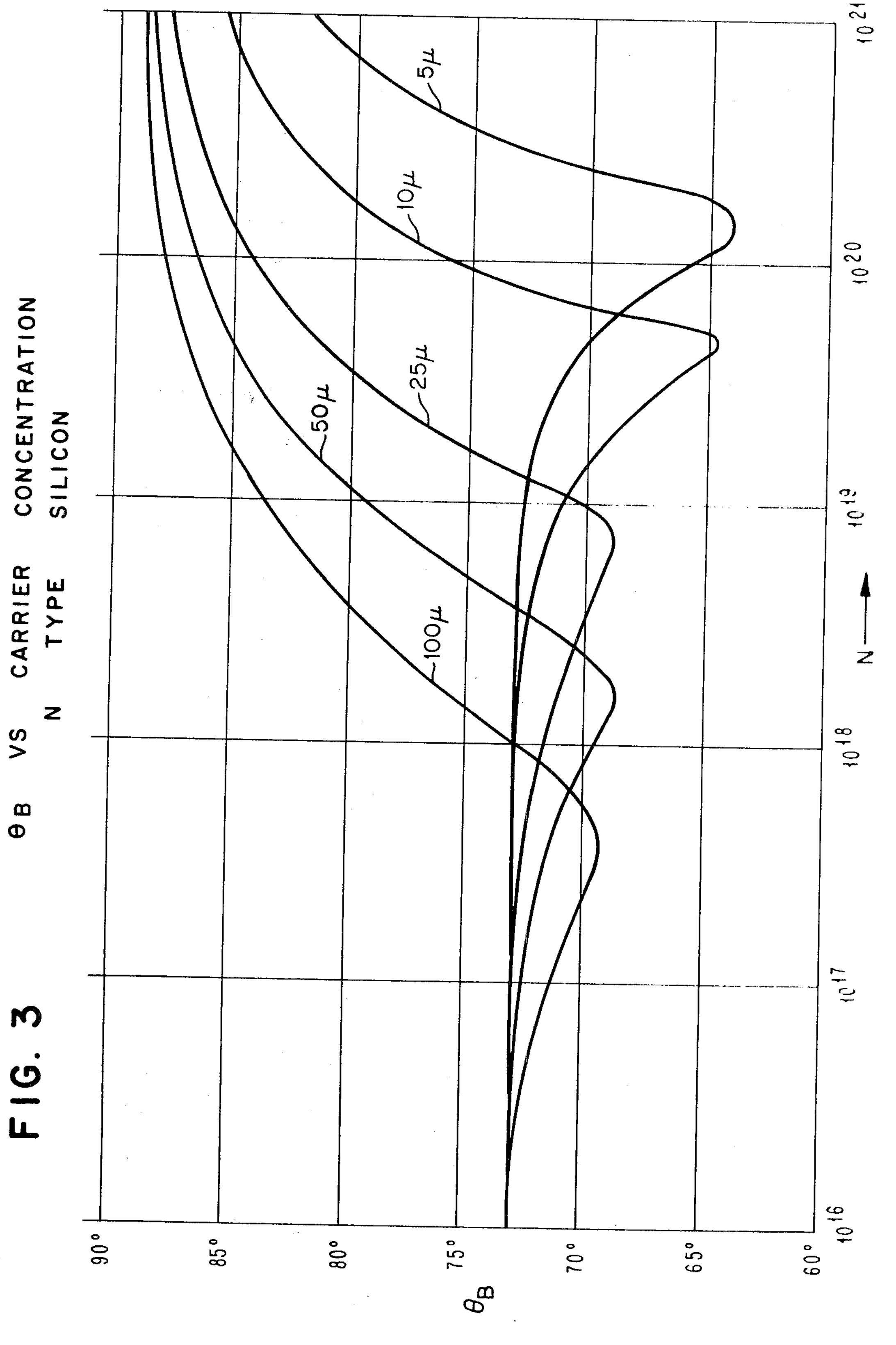
FIG. 3 is a graph of $\theta_B$ versus carrier concentration, for polarized light of various infrared wavelengths.

FIG. 3 is a graph of $\theta_B$, the angle at which polarized reflectivity $R_p$ attains a minimum, versus carrier concentration. The curves show five representative traces for 5, 10, 25, 50 and 100 microns of infrared wavelength incident light. With higher wavelengths the range of carrier concentration that can be determined increases.

In certain regions also the carrier concentration is double valued for one $\theta_B$; that is, there may be two possible values of carrier concentration for a given $\theta_B$. In FIG. 3, for example, which are typical curves for N-type silicon, there are two possible values of carrier concentration when $\theta_B$ is equal to or less than 73°. To overcome this difficulty one of three approaches can be used.

Figure 4:
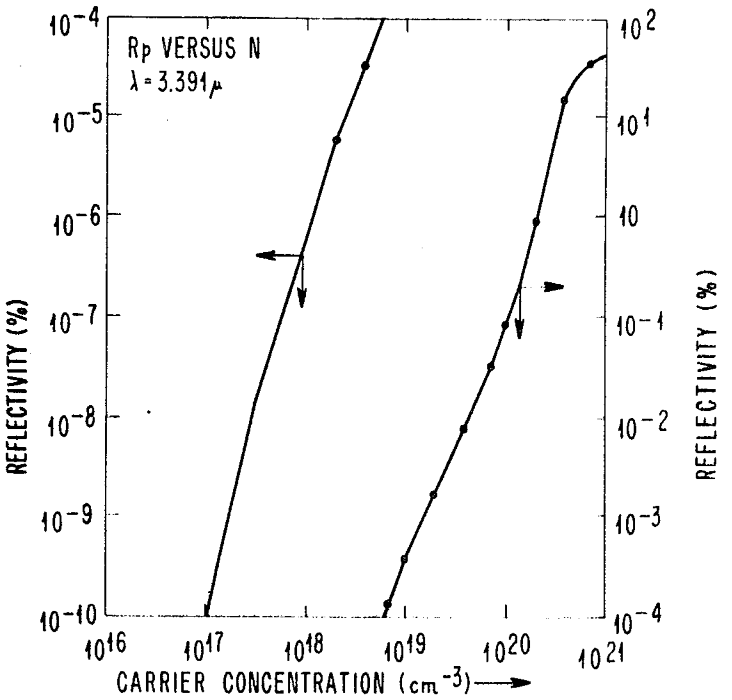
FIG. 4 is a plot of the parallel reflectivity at $\theta_B$ versus carrier concentration.

The first approach, illustrated with respect to FIG. 4, is to measure the actual parallel reflectivity or intensity of reflected light at $\theta_B$. FIG. 4 relates the value of this reflectivity to the carrier concentration. It illustrates that reflectivity is strongly dependent on concentration at $\theta_B$. Thus, even a crude measurement of the order of magnitude of $R_p$ would determine which of the two values of N is correct.

Figure 5:
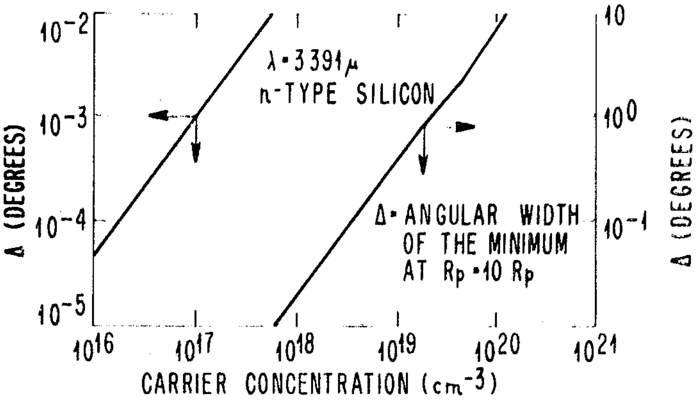
FIG. 5 is a plot of angular width or sharpness $\Delta$ at values of reflectivity an order of magnitude greater than the value of reflectivity at $\theta_B$ versus carrier concentration; and, FIG. 6 is a plot of reflectivity at $\theta_B$ versus carrier concentration, where the electric vector of the incident polarized light is perpendicular to the plane of incidence, as well as a plot of $\theta_B$ versus carrier concentration.

A second approach, illustrated with respect to FIG. 5, is to measure the angular width or sharpness $\Delta$ at values of reflectivity an order of magnitude greater than the value of reflectivity at $\theta_B$. Again one notes that $\Delta$ is highly dependent on carrier concentration.

Figure 6:
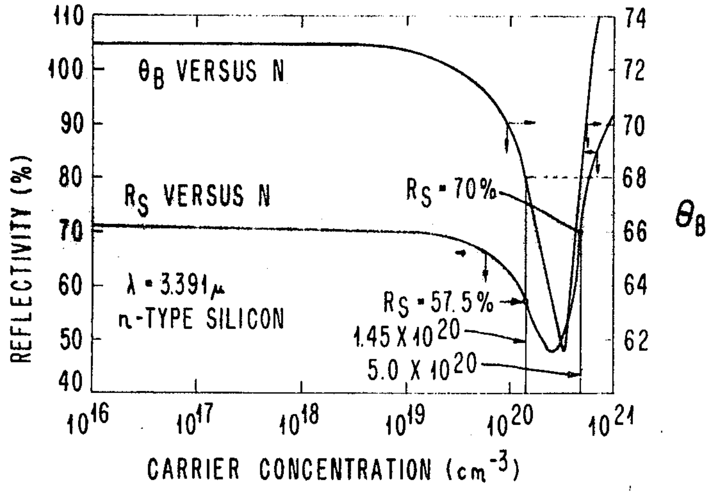

Still another approach, illustrated with respect to FIG. 6, is to measure reflectivity $R_s$ at $\theta_B$ of the light polarized perpendicular to the plane of incidence, either by rotation of polarizer 12 or light source 11. Thus, although there may be two carrier concentrations for the same $\theta_B$, there are two quite dissimilar values for perpendicular reflectivity, the two values being highly dependent on carrier concentration.

Thus, what has been described is an accurate, inexpensive, nondestructive, contactless technique for measuring the carrier concentration of a semiconductor. The technique can be used over a lower range of carrier concentrations heretofore not achieved. An additional advantage is that the technique merely requires finding an angle at which reflectivity attains a minimum, and thus is independent of drifts in the light source or detector.

While the invention has been particularly shown and described with reference to the preferred embodiments thereof, it will be understood by those skilled in the art that the foregoing and other various changes in form and details may be made therein without departing from the spirit and scope of the invention.

What is claimed is:

1. The method of determining the equilibrium carrier concentration in a semiconductive material which comprises:

directing monochromatic light from the infrared region upon the material, said light being polarized with its electric vector in the plane of incidence and whose wavelength corresponds to light whose energy is less than the energy of the band gap of the material;

varying the angle of incidence of the light upon the material to determine the angle of minimum reflectivity for the light; (and,)

measuring the intensity of the light reflected from said material at a plurality of the various angles including the angle of minimum intensity of the light comparing the aforementioned measurements with (to determine) standard measurements to determine the equilibrium carrier concentration of said semiconductive material.

2. The method according to claim 1 further including, where equilibrium carrier concentration is double-valued for a single angle of minimum reflectivity measuring the absolute intensity of the reflected beam (to determine which) at the angle of minimum reflectivity and correlating the aforementioned intensity measurement with said carrier concentration. (of two possible values of carrier concentration for a given angle of minimum reflectivity is correct.)

3. The method according to claim 1 further including, where equilibrium carrier concentration is double-valued for a single angle of minimum reflectivity, measuring the absolute intensity of the reflected beam at angles above and below the angle of minimum reflectivity (and determining the angular spread required to obtain the same magnitude of intensity at an angle above and below the angle of minimum reflectivity.) to obtain an angular spread measurement and correlating the aforementioned angular spread measurement with said carrier concentration.

4. The method according to claim 1 further including, where equilibrium carrier concentration is double-valued for a single angle of minimum reflectivity, measuring the absolute intensity of the reflected light polarized perpendicular to the plane of incidence at the angle of minimum reflectivity and correlating the aforementioned intensity measurement with said carrier concentration.

* * * * *